(12) United States Patent
Willner et al.

(10) Patent No.: US 6,365,007 B1
(45) Date of Patent: Apr. 2, 2002

(54) PHOTOCATALYSTS FOR THE DEGRADATION OF ORGANIC POLLUTANTS

(75) Inventors: Itamar Willner, Movasseret Zion; Koodali Ranjit, Jerusalem, both of (IL)

(73) Assignee: Yissum Research Development Company of the Hebrew University of Jerusalem, Jerusalem (IL)

( * ) Notice: Subject to any disclaimer, the term of this patent is extended or adjusted under 35 U.S.C. 154(b) by 0 days.

(21) Appl. No.: 09/509,700

(22) PCT Filed: Sep. 28, 1998

(86) PCT No.: PCT/IL98/00471

§ 371 Date: Sep. 25, 2000

§ 102(e) Date: Sep. 25, 2000

(87) PCT Pub. No.: WO99/16548

PCT Pub. Date: Apr. 8, 1999

(30) Foreign Application Priority Data

Oct. 1, 1997 (IL) .................................................. 121877

(51) Int. Cl.$^7$ .......................... C07C 1/00; B01D 53/00; C02F 1/48; C01F 17/00; B01J 37/34

(52) U.S. Cl. .............................. 204/157.15; 204/157.3; 204/158.2; 210/748; 423/21.1; 423/263; 502/5; 502/302; 502/303; 502/350

(58) Field of Search ................................ 423/21.1, 263; 502/5, 302, 303, 350; 204/157.15, 157.3, 158.2, 158.21; 210/748

(56) References Cited

U.S. PATENT DOCUMENTS 5,145,587 A * 9/1992 Ishii et al. .................. 210/759

FOREIGN PATENT DOCUMENTS

| DE | 4241451 A1 | 12/1993 |
| JP | 06 182205 | 7/1994 |
| JP | 6-182205 A | * 7/1994 |
| JP | 07 088370 | 4/1995 |
| JP | 10 085607 | 4/1998 |

OTHER PUBLICATIONS

LeDuc et al., "Effect of Lanthana as a Stabilizing Agent in Titanium Dioxide Support", Ind. Eng. Chem. Res., vol. 35, No. 7, pp. 2473–2476. (no month available) 1996.*
Abstact only*
Schwitzgebel et al., "Role of the Oxygen Molecule and of the Photogenerated Electron in $TiO_2$–Photocatalyzed Air Oxidation Reactions," J. Phys. Chem. 1995, 99, 5633–5638, no month available.
Moser et al., "Surface Complexation of Colloidal Semiconductors Strongly Enhances Interfacial Electron–Transfer Rates," Langmuir 1991, 7, 3012–3018, no month available.
Hong et al., "Cobalt (II) Tetrasufophthalocyanine on Titanium Dioxide. 2. Kinetics and Mechanisms of the Photocatalytic Oxidation of Aqueous Sulfur Dioxide," J.Phys.Chem. 1987, 91, 6245–6251, no month available.
Lee et al., "Enhancement of Photocatalytic Activity of Titanium (IV) Oxide with Molybdenum (VI) Oxide," Mat.Res.Bull., vol. 28,pp. 1127–1134, 1993, no month available.
Chemical Abstracts 123:97719 (1995), no month available.
Chemical Abstracts 121:239300 (1994), no month avaliable.

* cited by examiner

Primary Examiner—Edna Wong
(74) Attorney, Agent, or Firm—Fish & Richardson P.C.

(57) ABSTRACT

A photocatalyst is provided consisting of $TiO_2$ doped with at least one lanthanide metal oxide. The photocatalyst may be prepared by forming a titanium-containing gel and then drying the gel and subjecting it to calcinations. The photocatalyst may be used in photodegradation of organic material.

9 Claims, 6 Drawing Sheets

PHOTOCATALYSTS FOR THE DEGRADATION OF ORGANIC POLLUTANTS

FIELD OF THE INVENTION

The present invention is in the field of photocatalysts for the degradation of organic pollutants. The present invention provides a novel semiconductor photocatalyst for use in such degradation, as well as a process for preparing such photocatalyst.

BACKGROUND OF THE INVENTION

Semiconductor photocatalysis for water and air purification has evoked considerable interest during the last decade. The application of such catalysts for the degradation of contaminants has been used successfully for the degradation of various organic compounds such as alkanes, aliphatic and aromatic carboxylic acids, aliphatic and aromatic halogenated compounds, alkenes, phenols, amines, surfactants, pesticides, heterocyclic compounds, as well as for the reductive deposition of heavy metals.

Titanium dioxide ($TiO_2$) is a chemically inert compound, stable under illumination conditions, relatively inexpensive and has proven to be an especially useful semiconductor for environmental applications (Schwitzbegel, J. et al., *J. Phys. Chem.*, 99 (1995), 5633). Excitation of $TiO_2$ by light energy leads to the formation of an electron-hole pair and in the presence of a suitable scavenger or surface states, the electron or hole are trapped, recombination is prevented and subsequent redox reactions occur. The photocatalytic degradation of organic materials by $TiO_2$ particles in aqueous media and in the presence of oxygen, is initiated by the formation of free hydroxide radicals (OH) which are capable to degrade organic compounds into water and carbon dioxide.

Effective degradation of organic pollutants is accomplished when the pollutant is preconcentrated at the semiconductor surface. There are known in the art several methods for enhancing interfacial electron-transfer reactions of $TiO_2$, wherein the properties of the $TiO_2$ particles have been modified by selective surface treatments such as surface chelation (J. Moser et al., Langmuir, 7 (1991), 3012), surface derivatization (Hong, A. P., et al., *J. Phys. Chem.*, 91 (1987), 6245) and selective doping of the crystalline matrix (Lee, W. et al., *Mater. Res. Bull.*, 28 (1993), 1127).

$TiO_2$ can be obtained by a sol-gel reaction, upon heating a gel containing it to a temperature of above 450° C. By dispersing or dissolving substances in such a matrix, a solid $TiO_2$ with homogeneously mixed substances may eventually be obtained. Furthermore, a $TiO_2$ solid prepared by the sol-gel method is characterized by a very large specific surface area and high pore volume, rendering this solid an excellent absorbent of various, molecules or ions which bind to its surface. The large specific surface area makes the $TiO_2$ attractive for catalytic applications.

Commercial products coated with $TiO_2$ having photoelectrochemically active surfaces have now entered the market. For example, the Japanese company Toto is marketing tiles for operating rooms and other hospital applications. Such tiles are also being used in rest rooms where they breakdown organic compounds deposited on the tiles and thus reduce the amount of microorganisms which grow on said organic compounds and thereby eliminate malodors. Another use of $TiO_2$ coated products is for street lighting appliances, from which organic pollutants emitted from vehicles have to be removed.

SUMMARY OF THE INVENTION

The adsorption of organic compounds onto the semiconductor surface is a critical step in the photodegradation process. Therefore, the preconcentration of the organic pollutant at the semiconductor surface is an especially important feature. It has been found, in accordance with the present invention, that such preconcentration can be enhanced by incorporating lanthanide ions such as europium or praseodymium ions, in a titanium dioxide matrix, e.g. by means of the sol-gel method mentioned above. The lanthanide ions incorporated in such a titanium dioxide matrix are capable of forming Lewis acid-base complexes with organic moieties such as double bonds, acids, amines, aldehydes, esters, ethers, thiols, alcohols, etc., and, hence, impart to the titanium dioxide photocatalyst enhanced activity for the degradation of organic compounds bearing such moieties.

It is an object of this invention to provide novel $TiO_2$ semiconductor photocatalysts (a photocatalyst being a catalyst induced to perform a catalytic activity by light) doped with oxides of lanthanide metals, which exhibit enhanced activities for the degradation of organic compounds and particularly organic pollutants.

It is a further object of the present invention to provide a process for the preparation of such photocatalysts.

The present invention provides a photocatalyst comprising $TiO_2$ doped with at least one lanthanide oxide. Preferably the molar ratio Ti:M being from about 100:0.5 to about. 100:5. At times, the lanthanide oxides may be incorporated as hydrates.

All elements with atomic numbers from 58 to 71 are known as lanthanide series, including Ce, Pr, Nd, Pm, Sm, Eu, Gd, Tb, Dy, Ho, Er, Tm, Yb, Lu. These elements are inner-transition elements. i.e. their electron configuration feature the filling of 4f orbitals and are capable to form complexes with electron donors.

Preferred lanthanide oxides for use in accordance with the invention are europium oxide, praseodymium oxide and ytterbium oxide. At times other metals may be incorporated into the photocatalyst, such as sodium, magnesium, iron, cobalt or palladium. Such other metals may be incorporated as ions, oxides and other metal containing compounds as complexes. Incorporation of such other metals should be at a level which will not seduce the catalytic activity of the photocatalyst.

As shown hereinbelow, $TiO_2$ photocatalyst doped with a lanthanide oxide, according to the present invention, exhibit enhanced activity, as compared to undoped $TiO_2$ photocatalyst, in degradation of functionalized organic compounds. The term "functionalized organic compound" denotes any compound having a functional group which may be a donor of electrons such as a double bond, carboxylic group, carbonyl group, aldehyde group, amine group, thiol, hydroxyl, ether, heterocyclic organic substrates, phosphate, phosphonate, etc. Organic compounds with functionalized groups may include a variety of noxious substances such as herbicides, intermediates used for the preparation of herbicides, various organic compounds used in industrial synthesis, pollutants, e.g. such emitted by vehicles or industrial combustors or power generators, airborne compounds with a malodor, chemical warfare gases such as nerve gas, mustard. gas, etc.

A specific example of functionalized organic compounds which may be degraded by the photocatalyst of the invention are a variety of aromatic compounds, e.g. such present in herbicides which include, inter alia, p-chlorophenoxyacetic acid, salicylic acid, trans-cinnamic acid, aniline and p-nitrobenzoic acid. Other specific examples include a variety of oily pollutants, e.g. in water.

By another aspect, the present invention provides a process for preparation of the above $TiO_2$-based photocatalyst. The process of the invention comprises: mixing a titanium (Ti) containing compound with a lanthanide metal (M) containing compound, to form a gel, the molar ratio Ti:M being from about 100:0.5 to about 100:5; drying the gel thus obtained; and subjecting it to calcination.

The titanium containing compound is typically isopropyl titanoate or titanium chloride. The lanthanide compound may either be lanthanide oxide or may be a precursor compound from which the lanthanide oxide may be obtained. A lanthanide precursor compound may for example be acetyloxy lanthanide or lanthanide nitrate.

The sol is typically prepared in an alcohol solution, the solvent being a lower alkanol. The gel may be formed by adding a catalytic amount of a strong acid to the sol.

The heat treatment may include a first drying step to cause evaporation of the alcohol and then a second calcination step which may be at a temperature of at least about 600° K at times above about 800° K.

The photocatalyst of the invention may be used in different forms and applied on different matrices for use in different media. Depending on its planned use, it may be formed into a powder, it may be formed into solid particles, it may be formed as a coating of a solid surface, it may be impregnated into an absorbent substrate, it may be incorporated into a liquid medium intended for application onto a surface (e.g. paint formulation), etc.

One example of use of the photocatalyst of the invention is to apply it on a surface on which various undesired organic materials are deposited so as to impart self-cleaning properties to such surfaces. For example, it may be applied on substrates such as floor or wall tiles for degrading various organic substances which may otherwise may become deposited on the surface and form a substrate for a growth of microorganisms which may give rise to health hazards and malodors (e.g. in restrooms). In another example, it may be applied onto glass or other translucent or transparent surfaces, e.g. those in street lamps, in order to degrade various substances which are emitted from vehicles' engines and which thus become deposited on to these surfaces. The application of the photocatalyst of the invention on to such surfaces may be by applying the gel on to the surface (e.g. by immersion into the gel, by spraying or by other known coating techniques) and then heat treating the surface to dry the gel and cause it to calcinate. Additionally, the photocatalyst may be applied as a powder within a liquid formulation (e.g. a formulation comprising the photocatalyst particles and binders such as a paint formulation).

By another example, the photocatalyst of the invention is formed into air-pockets containing particles or coated or impregnated into such particles, which particles have the ability to float on water. Such particles are useful, for example, in degrading oil spills in water, in treatment of industrial effluents, etc. A particular example, may be the use of the photocatalyst of the invention applied as a coat of hollow glass spheres.

By another example, the photocatalyst of the invention may be impregnated into an absorbent material, e.g. a filter used in air conditioning systems, a filter used for filtering aqueous media, and others. In the air conditioning systems, impregnation of the filter with the photocatalyst of the invention will degrade organic substrates which are absorbed by the filter, which may otherwise serve as a growth medium for microorganisms.

By another example, the photocatalyst of the invention may be used to clean air or another medium from chemical warfare gases. In such use the photocatalyst may be applied to walls of shelter, incorporated in filters of shelters or gas masks, applied onto protective clothes, etc.

Other uses of photocatalysts of the invention may be in degradation of leftover pesticides, e.g. within the framework of a post-harvest treatment, cleaning water reservoirs from toxic and hazardous organic wastes, use in reactors and in purification plants for removal of organic waste from water, and any other applications.

In accordance with the invention there is further provided a method for the degradation of organic materials in an aqueous or gaseous environment, comprising contacting said medium with the photocatalyst of the invention.

It should be noted that in order to perform its catalytic activity, the photocatalyst of the invention should be exposed to light, which may be sun-light or artificial light, particularly U.V. light. In some applications the plotocatalyst of the invention may be included in a filtration system together with a light source, e.g. a U.V. light source.

DETAILED DESCRIPTION

The present invention will be better understood with the aid of the following detailed description of preferred embodiments, taken in conjunction with FIGS. 1 to 10. However, the invention is not limited to this detailed description.

Preparation of Photocatalyst

Figure 1:
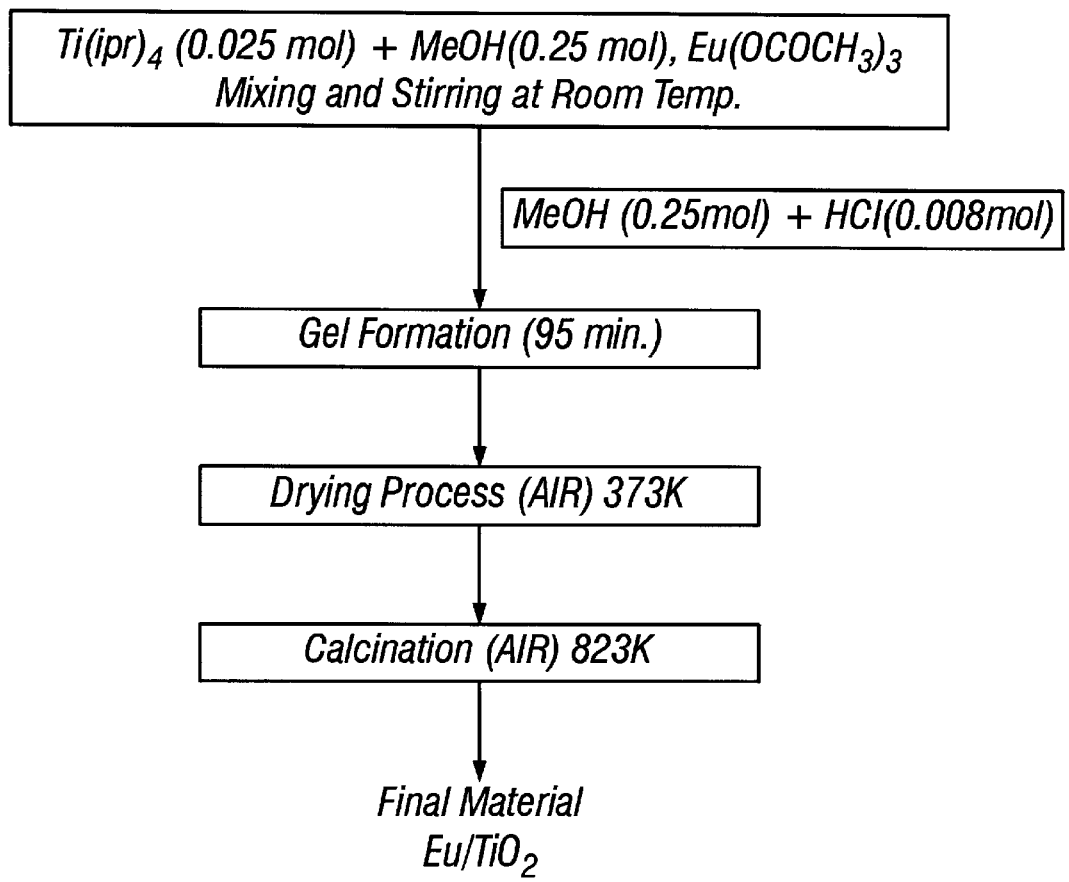
FIG. 1—is a flow chart of the manner of preparation of sol-gel titanium dioxide photocatalyst doped with europium oxide.

The lanthanide oxide or corresponding hydrated lanthanide oxide doped $TiO_2$ gel-sol derived catalyst was prepared by the acid-catalyzed sol-gel method as described in FIG. 1. The sol was prepared by stirring together isopropyl titanoate (IV), the europium precursor, namely europium acetate and methanol, at room temperature. After 15 minutes, a solution containing methanol and hydrochloric acid was added slowly to the sol, at room temperature. The obtained gels were dried at 373° K for hrs. Calcination was achieved by heating at 823° K for 14 hrs.

Two different catalyst containing europium oxides were prepared, with the following molar ratios between the titanium and europium: Ti/Eu=100 and Ti/Eu=20.

The praseodymium and ytterbium doped $TiO_2$ sol-gel derived catalysts were prepared in a similar manner. The precursor employed was praseodymium or ytterbium nitrate —$Pr(NO_3)_3.6H_2O$ or $Yb(NO_3)_3.6H_2O$ and the molar ratio between the titanium and praseodymium or ytterbium was Ti/Pr=100 or Ti/Yb=100.

The undoped $TiO_2$ catalyst was prepared in a similar manner, by mixing isopropyl titanoate (IV) and methanol, and subsequent calcination of the resulting dried gel. This catalyst was produced only for comparison studies, in order to highlight the improved activities of the $TiO_2$ doped with lanthanide oxide and/or the hydrated form.

Photocatalytic Experiments

Photochemical degradation of the organic substrates were performed in a quartz cuvette which contained a solution of the respective concentrations $1.5 \times 10^{-5}$ M to $6 \times 10^{-4}$ M and 2.0–2.5 mg of the catalyst. The suspension was irradiated by a 150 W Xe lamp (Oriel). Aliquots of the irradiated samples were collected at time intervals during the illumination. The samples were filtered through 0.2 $\mu$m membrane (Schleicher & Schuell, Germany) and the filtrate analyzed spectroscopically (Uvikon-860, Kontron spectrophotometer) for the content of organic substrate. Alternatively, the products were analyzed by GC-MS and the total carbon content (DOC) in the sample was determined.

Adsorption Studies

Adsorption of the organic substrate onto the catalyst was examined by stirring 10–12 mg of the catalyst in 2 mL of appropriate concentrations of the substrates in dark. After 1 hour of equilibration, the catalyst was filtered and the filtrate was analyzed spectroscopically. In order to express extents of adsorption in normalized form $n_2^s$, the number of moles of substrate adsorbed per gram of catalyst was calculated from $n_2^s=(\Delta CV)/1000:W$ where $\Delta C$=decrease in substrate concentration, V=volume of the solution and W is the weight of the catalyst.

Figure 2:
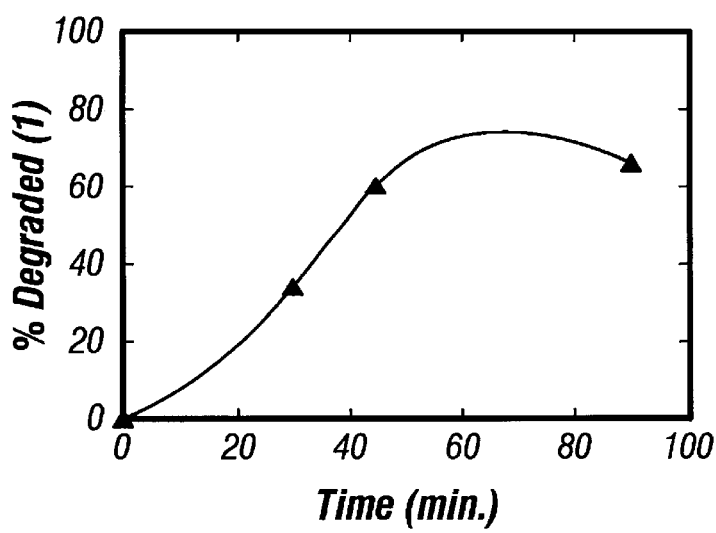
FIG. 2—Degradation of p-chlorophenoxyacetic acid (1) ($5.8 \times 10^{-4}$ M) over photocatalyst $Eu/TiO_2$ (Ti/Eu=20) (2.5 mg) at time intervals of irradiation.

Photocatalytic Degradation of p-Chlorophenoxyacetic Acid (1) over Europium Doped $TiO_2$ Photocatalysts Phenoxy acid herbicides are used extensively for weed control. Phenoxy acid herbicides are very potent herbicides even at low concentrations. Hence, it was of interest to examine the degradation of p-chlorophenoxyacetic acid (1). The photocatalytic degradations of p-chlorophenoxyacetic acid (1) was examined in the presence of unmodified $TiO_2$ and europium doped $TiO_2$ (Ti/Eu=20). FIG. 2 shows the rate of degradation of (1) as a function of irradiation time over Eu based $TiO_2$ photocatalyst. After 1 hour of irradiation, approximately 65% of (1) is degraded.

To account for the enhanced photocatalytic activity of europium doped $TiO_2$, the adsorption of (1) to the modified and unmodified photocatalyst was examined.

Figure 3A:
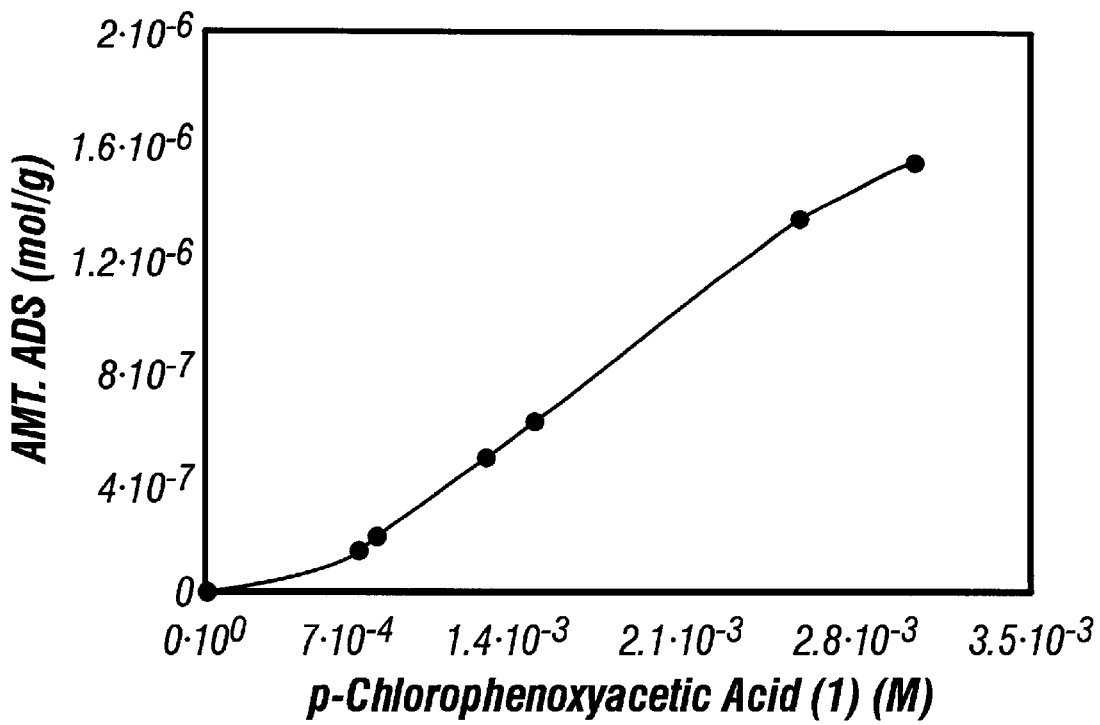
FIG. 3A—Adsorption isotherm for p-chlorophenoxyacetic acid (1) over europium doped $TiO_2$ (Ti/Eu20) catalyst.
Figure 3B:
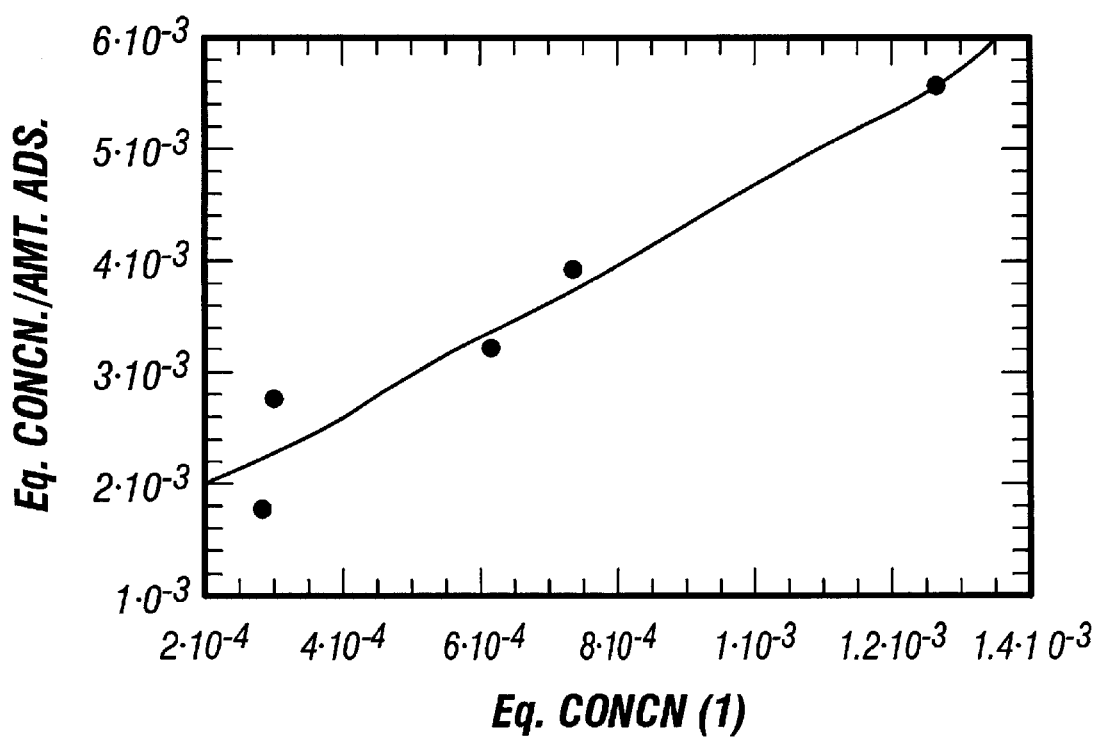
FIG. 3B—Langmuir analysis for the adsorption of p-chlorophenoxy-acetic acid (1) over europium doped $TiO_2$ (Ti/Eu=20) catalyst.
Figure 4A:
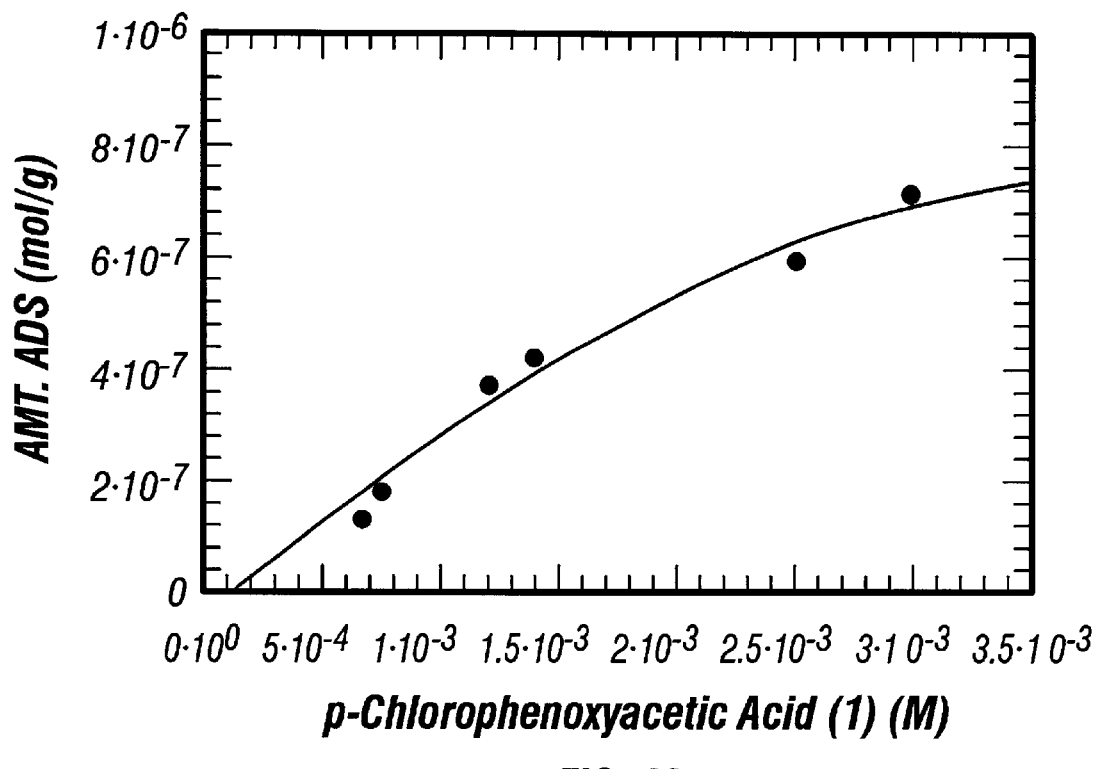
FIG. 4A—Adsorption isotherm for p-chlorophenoxyacetic acid (1) over $TiO_2$ catalyst.
Figure 4B:
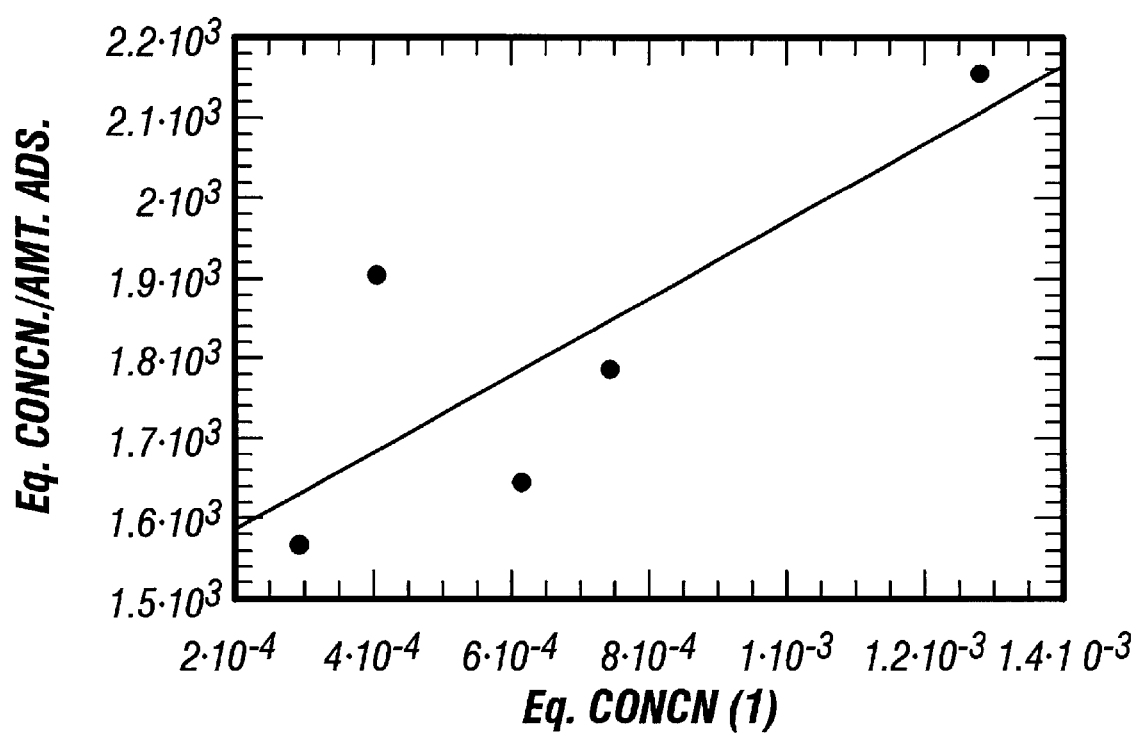
FIG. 4B—Langmuir analysis for the adsorption of p-chlorophenoxy-acetic acid (1) over $TiO_2$ catalyst.

FIG. 3A shows the adsorption isotherm of p-chlorophenoxyacetic acid (1) onto the modified photocatalyst, namely europium doped $TiO_2$ (Ti/Eu=20). The amount of adsorbed (1) increases as the bulk concentration of the organic substrate increases and it levels off at a bulk concentration of (1) that corresponds to about $3 \times 10^{-3}$ M. The adsorption isotherm can be analyzed in terms of the Langmuir theory, FIG. 3B. A linear relationship between $[S]_{eq}/S_{ads}$ as a function of $[S]_{eq}$ is observed, where $[S]_{eq}$ is the equilibrium bulk concentration of p-chlorophenoxyacetic acid and $S_{ads}$ is the amount (in moles) of (1) adsorbed onto the photocatalyst. From the ratio of the intercept and the slope, the derived adsorption constant corresponds to $K_{ads}=2.7 \times 10^3$ $M^{-1}$. FIG. 4A shows the adsorption isotherm of (1) onto undoped $TiO_2$ and FIG. 4B shows the analysis of the adsorption isotherm in terms of the Langmuir theory. The adsorption constant of (1) to unmodified $TiO_2$ was found to be $K_{ads}=3.2 \times 10^2$ $M^{-1}$. The enhanced adsorption of (1) to the Eu doped $TiO_2$ can be attributed to the formation of a Lewis acid-base complex between p-chlorophenoxyacetic acid (1) and the europium ions. The concentration of the organic substrate at the semiconductor surface could then explain its enhanced photodegradation.

Figure 5:
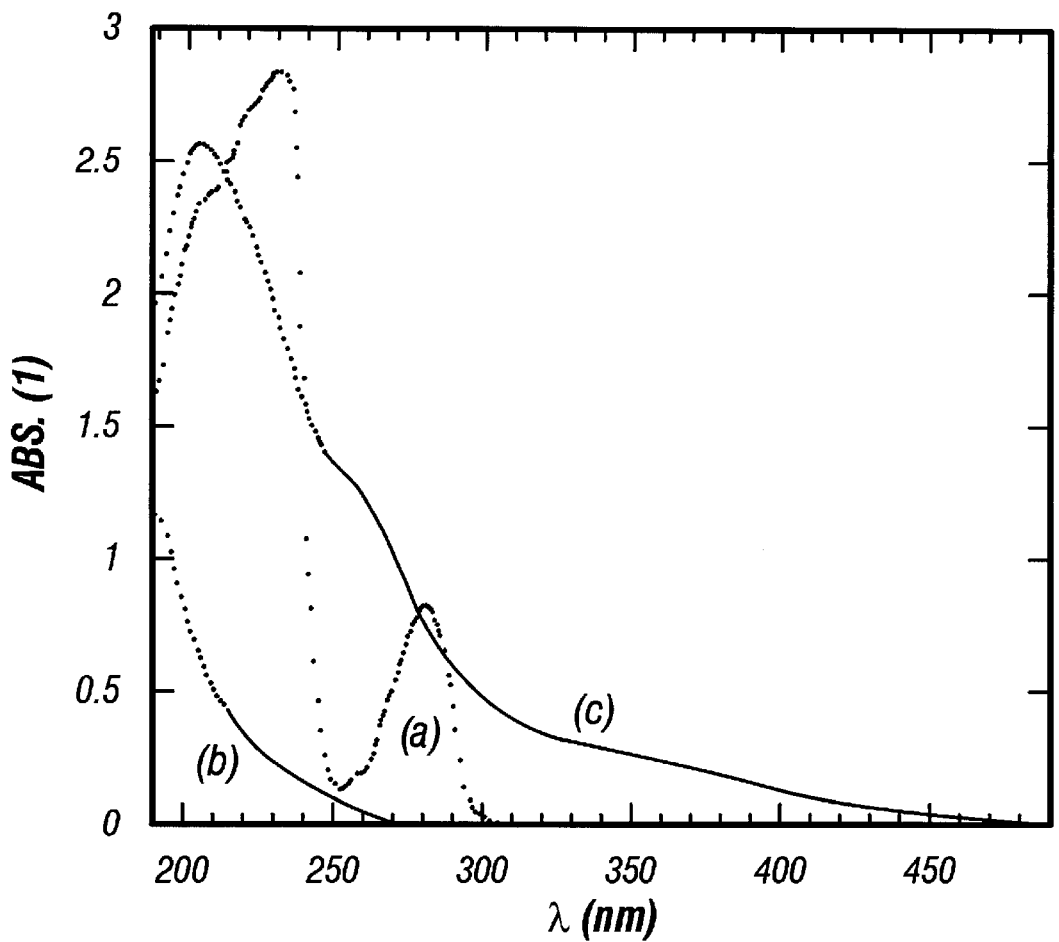
FIG. 5—UV Absorption spectra of p-chlorophenoxyacetic acid (1) ($5.8 \times 10^{-4}$ M) (a) before irradiation; (b) after irradiation over photocatalyst $Eu/TiO_2$ (Ti/Eu=100) (2.3 mg) for 1 hour; and (c) after irradiation over photocatalyst $TiO_2$ (2.5 mg) for 1 hour.

The optical behavior of suspensions of titanium dioxide and europium doped titanium dioxide under photocatalytic reaction conditions are expected to be different. For example, a different impact from the absorption and scattering should be expected and consequently the degradation rates will be significantly different. Europium dioxide has an absorption in the wavelength of interest and hence can act as internal optical filter. Thus, the fraction of light available by the europium doped $TiO_2$ catalyst (Ti/Eu=20) for the effective degradation is lower when compared to the pure $TiO_2$ catalyst due to this optical screening. Thus, in order to ameliorate this effect and also in order to understand the influence of Eu ions in the degradation of the organic substrates, a second catalyst having a lower europium content (Ti/Eu=100) was prepared. FIG. 5 shows the U.V. spectrum of p-chlorophenoxyacetic acid (1) before irradiation and after irradiation in the presence of europium doped $TiO_2$ (Ti/Eu=100) and unmodified $TiO_2$. It is evident that there is complete mineralization by the europium doped $TiO_2$ photocatalyst, whereas there is(are) formation of intermediate(s) (not determined, the solution after irradiation turned yellow in color) where $TiO_2$ was used as the photocatalyst. It is also evident from FIG. 6 that the TiO/Eu=100 photocatalyst is superior to the $TiO_2$/Eu=20 photocatalyst due to improved light absorbance by the former catalyst.

Degradation of Salicylic Acid, (2) and trans-Cinnamic Acid (3) over Europium Doped $TiO_2$ Photocatalyst (TV/Eu=20)

Figure 6:
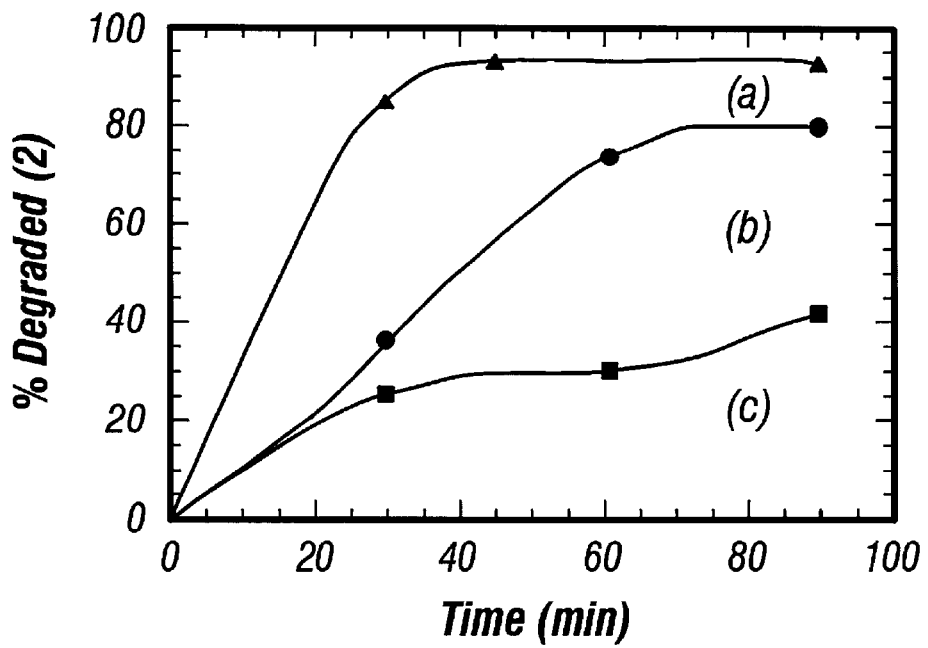
FIG. 6.—Degradation of salicylic acid (2) ($2.65 \times 10^{-4}$ M) over photocatalyst (a) $Eu/TiO_2$ (Ti/Eu×100); (b) $Eu/TiO_2$ (Ti/Eu=20); and (c) $TiO_2$ (2.5 mg) at time intervals of irradiation.
Figure 7:
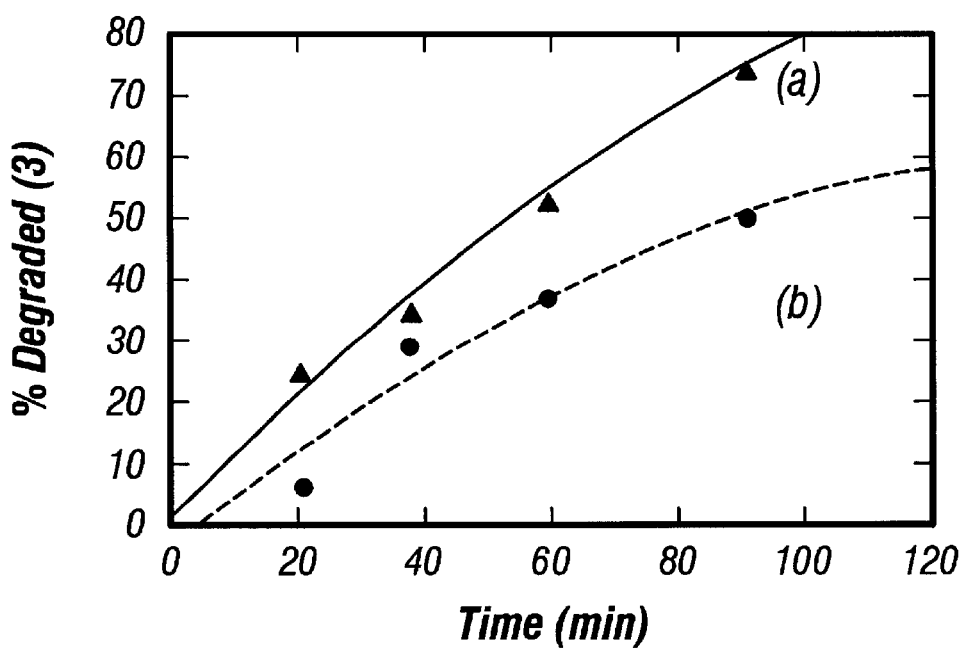
FIG. 7—Degradation of trans-cinnamic acid (3) ($1.73 \times 10^{-5}$ M) over photocatalyst (a) $Eu/TiO_2$ (Ti/Eu=20); and (b) $TiO_2$ (2.5 mg) at time intervals of irradiation.

The photodegradations of these two substrates were examined in the presence of europium doped $TiO_2$ catalyst and the undoped $TiO_2$ catalyst. FIG. 6 and FIG. 7 show the degradation rates of salicylic acid (2), and trans-cinnamic acid (3) over europium doped $TiO_2$ catalyst (Ti/Eu=20) as a function of irradiation time. The photocatalytic degradation of (2) and (3) is enhanced in the presence of europium doped $TiO_2$ catalyst. There is ca. two fold enhancement in the photodegradation of these two substrates over europium doped $TiO_2$ catalyst when compared with the undoped $TiO_2$ photocatalyst.

Figure 8:
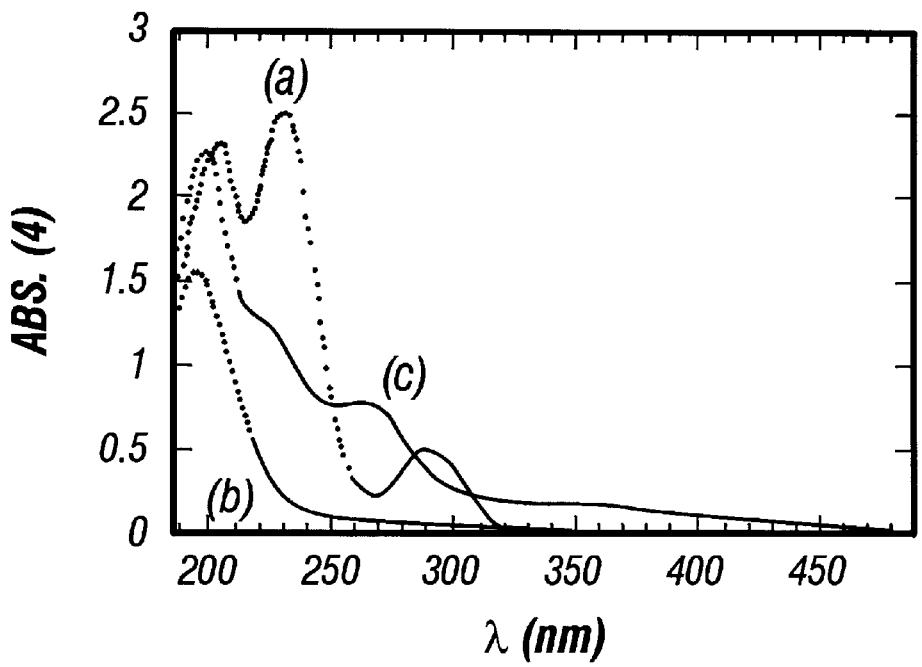
FIG. 8—Absorption spectra of aniline (4) ($3.5 \times 10^{-4}$ M) (a) before irradiation; (b) after irradiation over photocatalyst $Eu/TiO_2$ (Ti/Eu=100) (2.2 mug) for 1 hour; and (c) after irradiation over $TiO_2$ catalyst (2.3 mg) for 1 hour.

Degradation of an Aniline (4) and p-nitrobenzoic Acid (5) Over Europium Doped $TiO_2$ FIG. 8 shows the U.V. spectrum of aniline (4) before irradiation and after irradiation in the presence of europium doped $TiO_2$ (curve b) and unmodified $TiO_2$ (curve c). It is clearly evident that the europium doped $TiO_2$ catalyst reveals enhanced photocatalytic activity when compared with the undoped $TiO_2$ catalyst. Almost complete mineralization is achieved after one hour of irradiation. In contrast, in the presence of $TiO_2$ catalyst, the solution turned yellow in color after irradiation indicating the presence of intermediates (not determined). There is ca. three fold enhancement in the photodegradation of p-nitrobenzoic acid (5) over europium doped $TiO_2$ catalyst when compared with the undoped $TiO_2$ photocatalyst. The enhanced degradation exhibited by the europium doped $TiO_2$ catalyst can be attributed to the formation of a Lewis acid-base complex between the europium ions and the substrate.

A comparison between the yields of degradation of a series of compounds by the different photocatalysts is shown in Table 1. It is evident that the lanthanide-oxide doped $TiO_2$ reveals an unprecedented high photodegradation yield. For example while p-chlorophenoxyacetic acid (1) is degraded at a yield of 33% by undoped $TiO_2$ the same pollutant is being completely mineralized under identical irradiation, and the degradation yield is 90–97% when using Eu or Pr doped photocatalysts. Another clear example is the photodegradation of p-nitrobenzoic acid (5), where the undoped $TiO_2$ yields after 60 minutes of irradiation a degradation yield that corresponds to 24% The lanthanide doped photocatalysts $TiO_2$/Eu and $TiO_2$/Pr, under similar irradiation conditions bring about complete degradation of the pollutant (degradation yield 100%).

Degradation of p-chlorophenoxyacetic Acid (1) and Aniline (4) over Pr doped $TiO_2$ catalyst (Ti/Pr=100)

Figure 10:
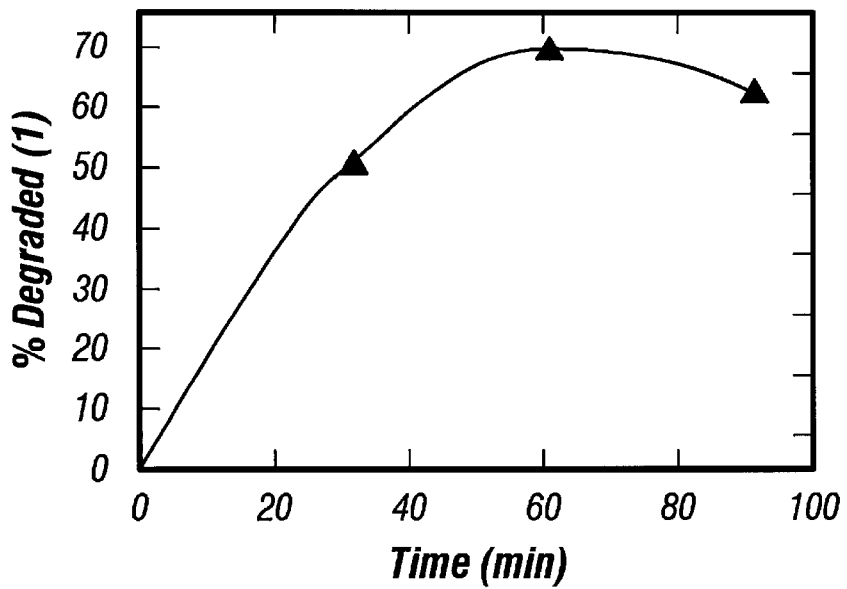
FIG. 10—Degradation of aniline (5) ($3 \times 10^{-4}$ M) over photocatalyst $Pr/TiO_2$ (Ti/Pr=100) (2.5 mg) at time intervals of irradiation.
Figure 9:
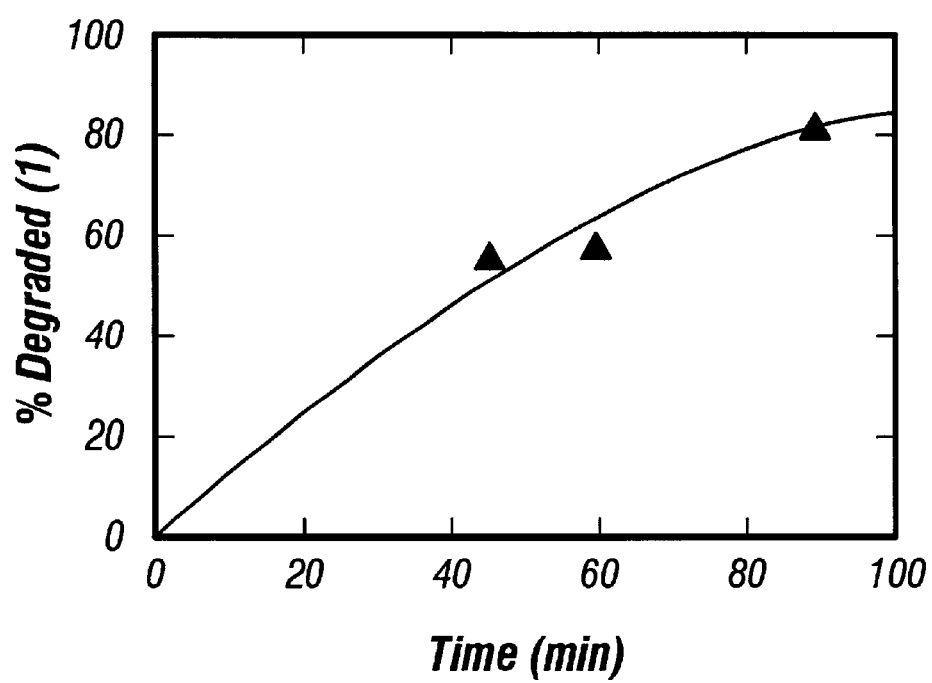
FIG. 9—Degradation of p-chlorophenoxyacetic acid (1) ($5 \times 10^{-4}$ M) over photocatalyst $Pr/TiO_2$ (Ti/Pr=100) (2.5 mg) at time intervals of irradiation.

In order to extend the generality of this concept we examined the degradation of p-chlorophenoxyacetic acid (1) and aniline (4) over Pr doped $TiO_3$ catalyst. FIG. 9 and FIG. 10 show the rate of degradation of (1) and (4) as a function of irradiation time over Pr doped $TiO_2$ catalyst (Ti/Pr=110). Table 1 shows that the Pr doped $TiO_2$ exhibits superior photocatalytic degradation activities as compared to undoped $TiO_2$.

TABLE I

| Compound | Photocatalyst | Initial Concn. of Pollutant | Concn. of Pollutant after Irradiation[b] | Degradation Intermediates | Degradation Yield (%) |
|---|---|---|---|---|---|
| p-Chlorophenoxyacetic acid (1) | undoped-$TiO_2$ | 420 ppm | 280 ± 40 ppm[a] (350 ± 40 ppm) | p-chlorophenol (14 ± 5 ppm) | 33% |
| | Ti/Eu (100:5) | 420 ppm | 88 ± 15 ppm[a] (100 ± 15 ppm) | p-chlorophenol (10 ± 3 ppm) | 90% |
| | Ti/Pr (100:5) | 420 ppm | 26 ± 5 ppm[a] (45 ± 15 ppm) | — | 97% |
| Salicytic acid (2) | undoped-$TiO_3$ | 345 ppm | 230 ± 10 ppm[a] | — | 32% |
| | Ti/Eu (100:5) | 345 ppm | 0 ppm[a] | — | 100% |
| | Ti/Pr (100:5) | 345 ppm | 0 ppm[a] | — | 100% |
| trans-Cinnamic acid (3) | undoped-$TiO_2$ | 400 ppm | 300 ppm[c] | benzoic acid (12 ppm) | 17.5% |
| | Ti/Eu (100:5) | 400 ppm | 130 ppm[c] | benzoic acid (27 ppm) oxatic acid (20 ppm) | 67.5% |
| | Ti/Pr (100:5) | 400 ppm | 141 ppm[c] | benzoic acid (21 ppm) | 65% |
| p-nitrobenzoic acid (5) | undoped-$TiO_3$ | 370 ppm | 280 ppm[a] | Oxalic acid (26 ppm) | 24% |
| | Ti/Eu (100:5) | 370 ppm | (2 ± 2 ppm)[a] | — | 100% |
| | Ti/Pr (100:5) | 370 ppm | (2 ± 2 ppm)[a] | — | 100% |

[a] after 60 minutes irradiation;
[b] concentration determined by GC-MS (in brackets DOC-values);
[c] after 15 minutes of Irradiation

What is claimed is:

1. A process for the preparation of a photocatalyst consisting of $TiO_2$ doped with at least one lanthanide metal oxide, the process comprising mixing a titanium (Ti) containing compound with a lanthanide metal M containing compound, to form a gel, the molar ratio Ti:M being from about 100:0.5 to about 100:5; drying the gel and subjecting it to calcinations, wherein the photocatalyst consisting of $TiO_2$ doped with at least one lanthanide metal oxide is prepared.

2. A process according to claim 1, wherein the lanthanide oxide is selected from the group consisting of europium oxide, prascodynium oxide and ytterbium oxide.

3. A method for the degradation of organic materials in an aqueous or gaseous medium, comprising contacting said medium with a lanthanide oxide-based photocatalyst prepared by the process of claim 1, and allowing degradation of said organic materials in the medium by said photocatalyst.

4. A method according to claim 3, wherein said organic materials in an aqueous or gaseous medium is a vapor or aqueous organic pollutant, the method comprising use of the photocatalyst in combination with a light source.

5. A method according to claim 3, wherein said organic materials in an aqueous or gaseous medium is a vapor or aqueous organic pollutant, the method comprising use of the photocatalyst immobilized on a support in combination with a light source.

6. A method according to claim 3, wherein said organic materials in an aqueous or gaseous medium is a vapor or aqueous organic pollutant from industrial waste, polluted water reservoirs or oil spills.

7. A method according to claim 3, wherein said organic materials in an aqueous or gaseous medium is a vapor organic pollutant selected from the group consisting of vaporized thiols, amines, phosphonates and phosphates which are toxic substances or malodors.

8. A process for the preparation of a photocatalyst, wherein active ingredients of the photocatalyst consist of a titanium and a lanthanide metal, for the degradation of organic pollutants, comprising:

a) providing a gel composition consisting of a titanium (Ti) containing compound and a lanthanide metal M, wherein the molar ratio of Ti:M is from about 100:0.5 to about 100:5;

b) subjecting the gel composition to calcination; and c) forming the calcinated product into any one of a powder form, solid particle form, or liquid form.

9. The process of claim 8, further comprising impregnating the calcinated product onto an absorbent substrate, incorporating the calcinated product into a liquid medium, or coating the calcinated product onto a solid surface.

* * * * *